Figure 2:
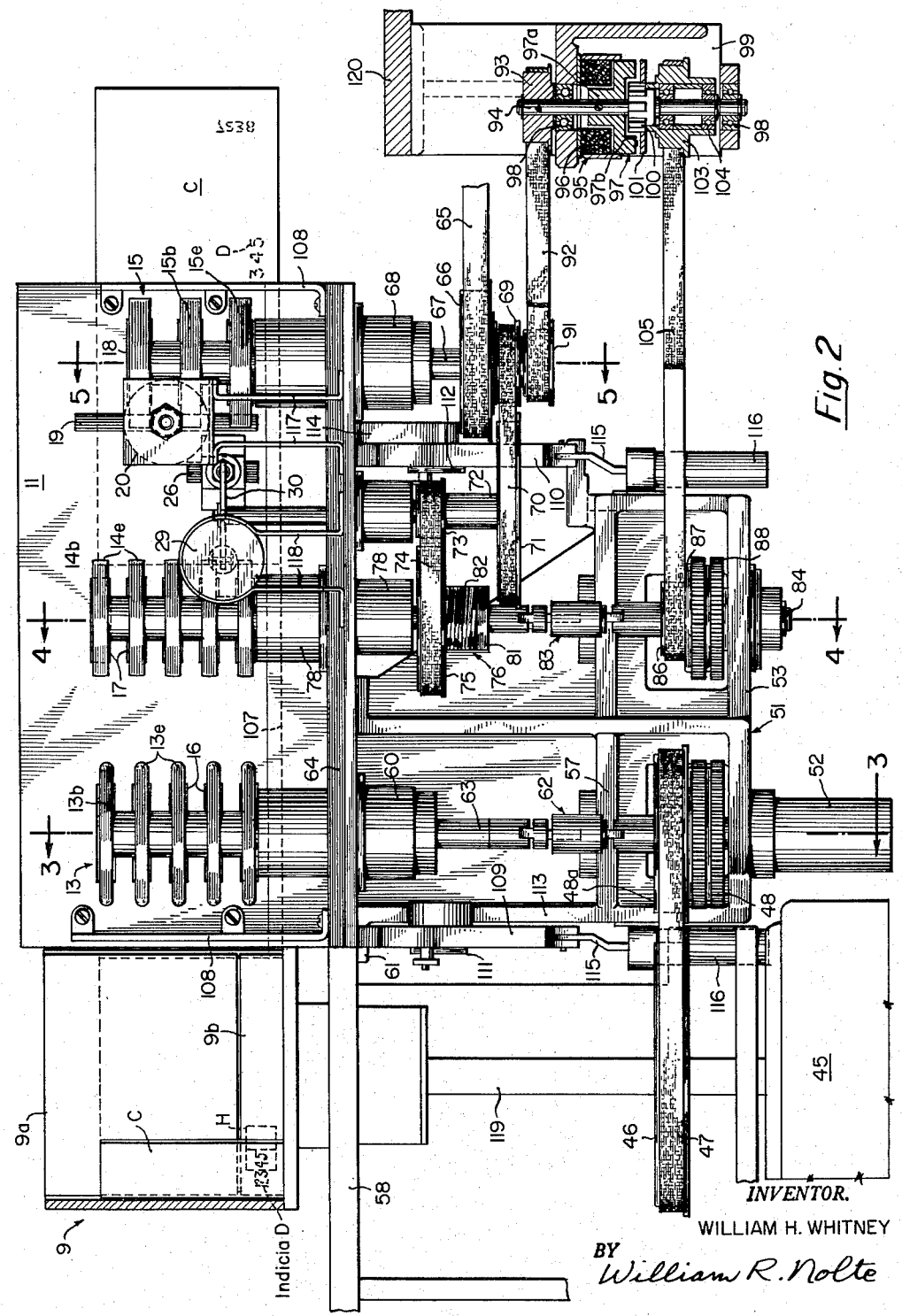

July 18, 1961 W. H. WHITNEY 2,992,821
SHEET HANDLING APPARATUS
Filed Dec. 18, 1958 3 Sheets-Sheet 1
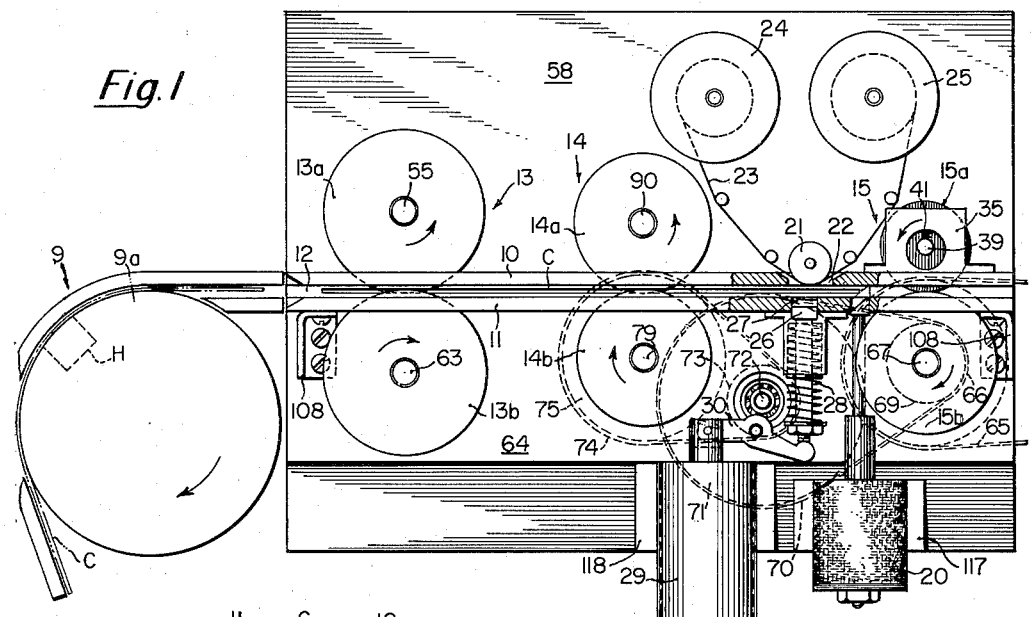
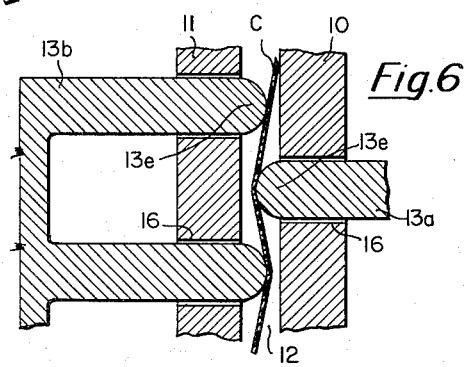
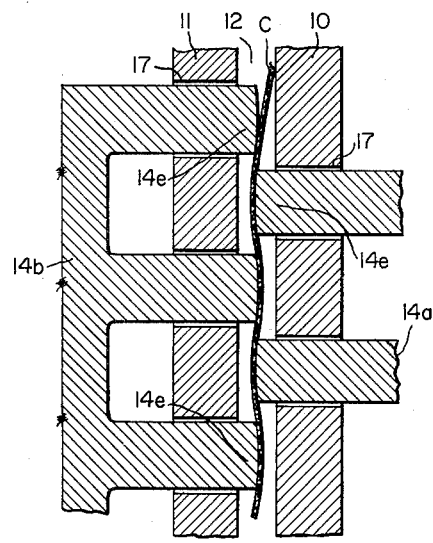
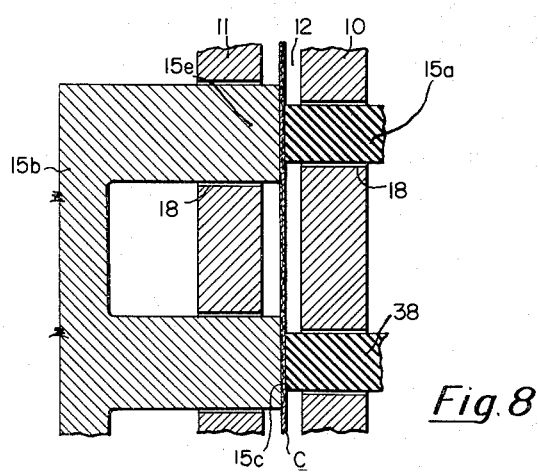
INVENTOR.
WILLIAM H. WHITNEY
BY William R. Nolte
AGENT July 18, 1961 W. H. WHITNEY 2,992,821
SHEET HANDLING APPARATUS
Filed Dec. 18, 1958 3 Sheets-Sheet 2

INVENTOR.
WILLIAM H. WHITNEY
BY William R. Nolte
AGENT

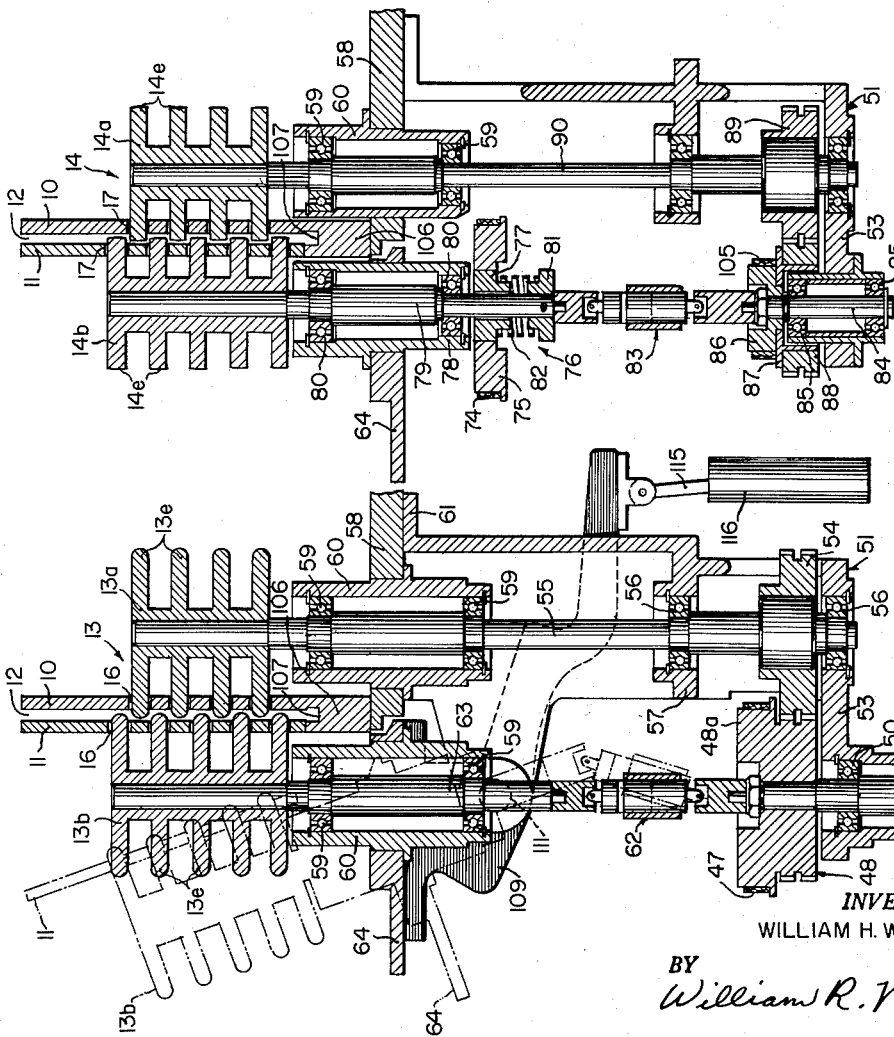

United States Patent Office 2,992,821
Patented July 18, 1961

2,992,821
SHEET HANDLING APPARATUS
William H. Whitney, Philadelphia, Pa., assignor to Burroughs Corporation, Detroit, Mich., a corporation of Michigan
Filed Dec. 18, 1958, Ser. No. 781,244
12 Claims. (Cl. 271—53)

This invention relates to sheet handling apparatus and more particularly to apparatus for handling paper items in the form of bank checks or cards.

In one type of automatic bank check reading and sorting machine checks imprinted with coded magnetic indicia are read by a reading device. Based on information read from the checks, the machine by means of a chute selection device directs each document into one of a plurality of stacker pockets. After several runs through the sorter, the checks are arranged in numerical sequence. The sorting machine may be used in combination with accounting or computing apparatus and when so used each check may be passed through the sorter as many as fifty times. These machines operate at high speeds and during some of these passes, it is necessary that the checks be decelerated to a slower speed after they are read to permit the interrogation of associated accounting machines or computers, or for some other reason. Once the information has been obtained the checks are reaccelerated and directed to preselected stacker pockets. The present invention is concerned with apparatus enabling under one mode of operation the decelerating and reaccelerating of sheet items such as bank checks.

In a similar manner the apparatus of the present invention may be utilized under another mode of operation to decelerate and stop checks for the same purpose as mentioned above or for the purpose of applying identification to each check in the form of printing, and thereafter reaccelerating the checks as they are directed to the stacker hoppers. In still another mode of operation, the checks may be conveyed through the apparatus of the present invention without slowing or stopping the same.

It should be apparent considering the large number of times that the checks are handled and also considering particularly the forces to which the checks are subjected during the above referred to decelerate-stop-reaccelerate operations, that machine damage to the checks becomes a most important problem. By way of example, if the leading edge of a check is slightly impacted or deformed in one pass through the sorter during subsequent passes through the machine the check will incur like damage in the same spot or area. Because of its cumulative nature, the damage to the check may become so great that it cannot pass through the machine but instead cause a check jam.

An important object therefore of the present invention is to provide a novel apparatus for handling sequentially fed sheet items.

Another important object of the present invention is to provide a novel sheet feeding apparatus having means for deaccelerating, stopping and reaccelerating sequentially fed sheet items without damage to the items.

Still another object of the invention is to provide a novel apparatus for so handling sequentially fed sheet items which are of the same size or of intermixed different sizes.

A further object is to provide such apparatus characterized by its minimum use of power and its substantially noiseless operation.

In accordance with the above objects and first briefly described the invention comprises improved apparatus for sequentially feeding sheet items and including means for deaccelerating such sequentially fed sheet items, stopping each item without damage, and thereafter reaccelerating the item.

The invention may be more fully understood by referring to the accompanying drawings which illustrate a preferred embodiment in which:

FIG. 1 is a plan view of the apparatus;
FIG. 2 is a side elevational view of the apparatus with parts broken away;
FIG. 3 is a sectional view taken along the line 3—3 of FIG. 2;
FIG. 4 is a sectional view taken along the line 4—4 of FIG. 2;
FIG. 5 is a sectional view taken along the line 5—5 of FIG. 2;
FIG. 6 is an enlarged view of a portion of the sectional view of FIG. 3;
FIG. 7 is an enlarged view of a portion of the sectional view of FIG. 4; and
FIG. 8 is an enlarged view of a portion of the sectional view of FIG. 5.

Briefly described a preferred embodiment of the invention illustrated herein includes three aligned pairs of opposed continuously rotating high speed rollers operable under one mode of operation to sequentially feed sheet items such as bank checks of the same or intermixed sizes at high speeds, for example, 400" per second, through a guideway. The center pair of rollers is operable at a much lower speed under another mode of operation to decrease the velocity of the checks as they pass through this pair of rollers to say 50" per second. Under a still further mode of operation, with the center pair rotating relatively slowly, stop means is projected into the guideway between the second and third pair of rollers so that the leading edge of each item strikes the gate and is stopped thereby, following which the gate is withdrawn to permit reacceleration of the items through the guideway by means of the third pair of rollers.

More specifically, as hereinafter described, the invention is shown incorporated in an automatic reading and sorting machine which includes a reading station 9 shown at the left hand side of FIGURES 1 and 2. A check C including indicia D imprinted along its bottom edge is shown being moved around a two-part drum 9a and 9b. The larger part of the drum 9a is rotated to feed the checks partially therearound for entry into a guideway. The second smaller part of the drum 9b is stationary and is provided with means H for sensing the indicia. The reading device may be similar to that described and claimed in the copending application of Harold M. Frederick, entitled "Record Handling and Reading Apparatus," filed December 31, 1958, Serial No. 784,284, and assigned to the same assignee as the present invention.

The apparatus as seen in FIGURES 1 and 2 includes a pair of vertically extending plates 10 and 11 arranged in closely spaced parallel relationship to one another to form a channel or guideway 12 into which items or check C are fed from the drum and through which they are transported, it being understood of course that the items C may all be of the same size or an intermixture of various sizes. Pairs of opposed continuously rotating rollers 13, 14 and 15 operating through slots 16, 17 and 18 respectively within the guideplates function to sequentially feed the items through the guideway. All the rollers are normally arranged to be rotated at the same speed for feeding the items all the way through guideway 12, but when it is desired to slow down and/or stop an item, the central opposed pair of rollers 14 are rotated at a much slower speed than rollers 13 and 15, as explained more fully hereinafter. Stop means in the form of a gate 19 disposed between roller pairs 14 and 15 is movable from a retracted inoperative or open position and to an advanced operative or closed position by a solenoid 20. When in its closed position the gate stops each item while the rollers continue to rotate at their respective constant velocities. The provision of smooth surfaces on the rollers enable them to slip on the surface of the stopped item and do not drive it with a force high enough to crumple it against the gate as will be described fully hereinafter.

While an item C is stopped in the guideway, it may be operated upon in any desirable manner. In the illustrated embodiment of the invention, a rotary printing wheel 21 having characters, not shown, on its peripheral surface is mounted to project through cutout 22 in plate 10 and into guideway 12 so that the characters thereon move tangentially to one surface of the stopped item C as the wheel rotates. An ink bearing ribbon 23, interposed between the item C and the drum, is suitably transported by reels 24 and 25. A printing hammer 26, reciprocable through opening 27 in plate 11 is mounted opposite the printing drum. A spring 28 normally urges the hammer in a direction away from the printing drum. Upon receipt of an electrical signal by solenoid 29, lever 30 is rotated counter-clockwise about its pivot to drive hammer 26 against check C to cause a sharp inward movement of the check against the type drum to effect printing on the check. The hammer is then immediately withdrawn. Thereafter the gate is moved to its open position, out of the path of the check, and the pairs of rollers 13 and/or 14 will immediately advance the check to the high speed rollers 15 which eject the check from the guideway.

In the present embodiment of the invention, as seen in FIGS. 3, 4 and 5, the separate roller provisions 13 to 15 inclusive each include an opposed pair of rollers designated by letters "a" and "b" having disc or flange portions 13e, 14e and 15e respectively which extend into guideway 12 through slots 16, 17 and 18 in the guide plates respectively. The axially spaced disc portions 13e of the oppositely disposed rollers 13a and 13b are in intermeshing or slightly overlapping relationship, i.e., with the disc portions of one roller disposed in the spaces between the disc portions of its opposite roller. Disc portions 14e of rollers 14a and 14b are likewise disposed in similar staggered overlapping relationship. The amount of overlap between successive intermeshing portions of the oppositely disposed rollers is such as to accommodate different thicknesses of sheet material such as checks C. Checks passing between the pair of rollers 13 and 14 are temporarily corrugated as they are gripped by the disc portions as indicated in FIGURES 6 and 7 to impart columnar stiffness to the checks as they advance through the guideway 12.

It will be apparent that the amount of gripping action imparted to each item will depend upon its thickness and the stiffness inherent in its composition. In addition, the amount or degree of gripping is a function of the beam strength of the check in a direction perpendicular to its direction of motion. Thus a "grain short" bank check, i.e., a check with its grain perpendicular to direction of travel, will offer a greater resistance to transverse deflections than a "grain long" check and is thus slowed more by the rollers as will be described in more detail hereinafter. It will be equally apparent, however, that a grain short check when it strikes stop 19 will have a tendency to suffer greater deformation than a grain long check, hence it follows that it is desirable to slow down a grain short check a greater amount than a grain long check since the grain short checks are more vulnerable to edge damage. It also follows that the degree of gripping action of the rollers is a function of the thickness of the item, in that a thick item will be deflected more and hence slowed down to a greater degree than a thinner item which would be deflected to a lesser degree.

When an item is stopped in the guideway, as by gate 19, the roller pairs 13 and 14 continue to rotate at their respective individual speeds and their disc portions merely slide over the surfaces of the stopped item but do no harm to the check because the energizing surfaces of the rollers are formed of a highly polished smooth material, such as stainless steel. After the stopped check has been printed upon and the hammer 26 and the gate 19 have been withdrawn from the guideway, out of the path of movement of the check, rollers 13 and 14 cease slipping on the check and deliver sufficient force to accelerate the check and transport it to the positive grip rollers 15. When the leading edge of the check enters the high speed rollers 15 it is permitted to further accelerate to high speed immediately, because of the slippage permitted on the trailing portion of the check in slow speed rollers 14.

Referring now to FIGURES 3 and 6, it is seen that the surfaces of the discs 13e of the opposed rollers 13a and 13b are rounded in cross-section, the spacing of the discs and the radius of curvature of their rounded edges being such that only the outermost portion of each flange usually engages the checks. By comparison with FIGURES 4 and 7, it is seen that the center rollers 14 are of a slightly different construction than the rollers 13 previously described. The peripheral portions of the discs 14e are of a considerably flatter curvature in cross-section than disc portions 13e, FIGURE 6, and as a consequence make greater arcuate contact with the item C. Moreover, the free span between adjacent opposed disc portions 14e is shorter than between disc portions 13e and therefore a check is gripped more tightly by the disc portions 14e. This tighter gripping action coupled with the slower rotation of rollers 14 during a printing operation acts to remove much of the velocity energy from the check upon contact therewith when the fast travelling check is projected between the slower rotating rollers 14a and 14b. Thus when the check finally reaches the gate 19 interposed in its path, most of its velocity energy has been absorbed in slippage with the slower rotating rollers 14, and front edge deformation of the check, when stopped by the gate, is substantially eliminated.

It will be understood that checks are issued in various lengths ranging, for example, between 5¾" to 9½". Roller pairs 13 and 14 in the illustrated embodiment of the invention are so spaced relative to stop gate 19 that checks up to 7" when stopped by the gate are engaged only by rollers 14, while longer checks are engaged by both pairs of rollers 13 and 14. In eithere case, after the printing operation and the gate is retracted, the check is moved into high speed rollers 15 for further high speed movement along the guideway. Rollers 15 are spaced from rollers 14 a distance less than the length of the smallest check to be handled.

The positive grip rollers 15 are of a different construction than the previously described rollers 13 and 14 and can best be understood by referring to FIGS. 2 and 5. A block element 35 is fixed to guideplate 10 and supports idler roller 15a which is made up of a plurality of ring assemblies 37, each of which includes a tire 38 about its periphery, and each of which is mounted for rotation about a non-rotative stub shaft 39 by bearings 40. A pair of cantilever springs 41 suitably secured at one end to block 35 have their opposite ends secured to the projecting ends of each stub shaft 39 to provide a flexible or floating support for each roller assembly 37 and to urge the tires toward the roller 15b. The latter roller includes a plurality of axially spaced disc portions 15e arranged in opposed relation to the plurality of ring assemblies 37. Each disc 15e has an outer cylindrical surface 15c which engages the aforementioned tires 38 which have a high coefficient of friction. Springs 41 operate to maintain a uniform pressure against the checks irrespective of the wear of the tires or variations in the thickness of the items handled.

Referring now to FIGURES 2 and 3 a source of power for rotating the first pair of rollers 13 at high speed is continuously supplied by motor 45 through pulley 46, belt 47 and pulley hub 48a of gear 48, which is keyed to stub shaft 49. Bearings 50 positioned along the length of stub shaft 49 journal the latter for rotation in a sleeve housing 52 depending below the base plate 53 of a gear casing 51. Companion gear 54 meshes with gear 48 and is suitably keyed to shaft 55, the lower end of which is journalled for rotation by means of bearing 56 in intermediate plate 57 and base plate 53 of the gear casing. The top portion of shaft 55, to which roller 13a is keyed, is journalled for rotation in a horizontal main supporting plate 58 by means of bearings 59 received in sleeve 60, the latter being mounted in plate 58 as shown. The gear casing 51 is fixed to the underside of the supporting plate 58, such as by flange 61 at the top of gear case 51.

A universal joint or coupling generally indicated at 62 connects the aforementioned stub shaft 49 to shaft 63 which carries the drive roller 13b which is rigidly fixed thereto for joint rotation. It is observed that shaft 63 is journalled in a plate 64 by a sleeve 60 similarly to the journal mounting of shaft 55 in plate 58. Plate 64 lies in the same general plate as plate 58, but is unconnected thereto for purposes of readily separating the same. The universal coupling 62 provides means to permit movement of guide plate 11 and plate 64 relative to guide plate 10 and supporting plate 58. The universal coupling 62 is pivotally connected at its opposite ends to the shafts 49 and 63 and is axially extensible and retractible by the provision of an internal sliding key. Driving connection is maintained between the two shafts even though they assume angularly related positions as shown by the comparison of the full and dotted line positions of the coupling. Plate 11, although carried by plate 64, is supported in spaced relation thereabove as will be described in greater detail hereinafter.

With reference now to FIGURES 2 and 5 a corresponding continuous source of rotative power to drive rollers 15, received from a source, not shown, but which may be the motor 45 or another similar thereto, is delivered to belt 65 and pulley 66, the latter being keyed to shaft 67. Flanged sleeve member 68 secured to and extending through plate 64, rotatably supports shaft 67 by means of bearings 68a. Roller 15b fixed to the top portion of shaft 67 normally engages roller 15a as previously described. Pulley 69 lying beneath and of smaller diameter than pulley 66 is fixed to shaft 67 and transmits power by means of belt 70 to larger pulley 71 suitably keyed to idler shaft 72 journalled in plate 64, see FIGURE 2. Pulley 73 likewise keyed to idler shaft 72, transmits power to belt 74 and thence to pulley 75 fixed to a hub 77 of a one way drive spring clutch generally indicated at 76. Pulleys 71 and 73 on idler shaft 72 provide a speed reduction in order to rotate rollers 14 slower than rollers 15 and 13.

Flanged sleeve member 78, FIG. 4, also secured to and extending through plate 64 rotatably supports shaft 79 by means of bearings 80. The aforementioned hub 77 of spring clutch 76 is freely rotatably on shaft 79, while the lower hub 81 of the clutch is pinned to the shaft. When upper hub 77 is drivingly rotated by pulley 75, clutch spring 82 encircling both hubs 77 and 81 contracts and tightens thereupon and provides a driving connection to rotate lower hub 81 and thus to rotate shaft 79. However, no torque can be applied to the upper hub 77 by clutch spring 82 when lower hub 81 is rotated at a higher speed than the upper hub, the spring in this circumstance expanding and breaking the driving connection between the two hubs.

A universal coupling 83, similar to coupling 62, connects the lower end of shaft 79 to stub shaft 84, the latter being mounted for rotation in base plate 53 of casing 51 by means of bearings 85. A pulley 86 fixed to shaft 84 has mounted thereon a sleeve 87 to which a gear 88 is fixed to mesh with companion gear 89 keyed to roller shaft 90, the latter carrying the roller 14a on the upper end thereof. With reference to FIGURES 3 and 4, it is seen that shaft 90 is mounted in a similar manner as shaft 55.

An alternative mode of operation of the apparatus exists when the center rollers 14 are driven at the same speed of rotation as rollers 13 and 15. This operational condition, for example, corresponds to the situation where the items or checks are run through the machine and thence into a sorter a number of times in quick succession in order to arrange the checks in numerical sequence prior to printing upon the same or prior to using the checks in conjunction with accounting equipment. The speed of rotation of rollers 14 should be increased to the same speed of rotation as rollers 13 and 15 for efficient operation. For this purpose an alternate drive system is provided for the center rollers 14, which may be best followed by referring to FIGURES 2 and 5. Pulley 91 fixed to shaft 67 beneath pulley 69 drives belt 92 which in turn rotates pulley 93, the latter being keyed to clutch shaft 94 of an electromagnetic clutch 95 of well known construction. Stationary electrical windings 96 encircle hub extension 97a of a clutch plate or disc 97, which is pinned to shaft 94, the latter shaft being mounted for rotation at its ends, top and bottom, by means of bearings 98 in clutch casing 99. A splined hub 100 freely rotatable on shaft 99 has mounted thereon a clutch disc 101 which rotates in unison with the hub 100. The disc is movable axially of said shaft on the splines of hub 100 upon energization and deenergization of windings 96. The disc 101 is attracted by the magnetic field to move vertically so that its upper side engages the lower roughened surface 97b of clutch plate 97 and splined hub 100 is thereby rotated about shaft 94. Pulley 103 fixed to hub 100 and mounted for rotation about shaft 94 on bearings 104 is thus rotated and through belt 105 drives the aforementioned pulley 86 fixed to shaft 84, see FIGURE 4, and thus directly drives shaft 79 through universal coupling 83. As previously explained, the lower hub 81 of spring clutch 76 cannot transmit torque to the upper hub 77 through the spring 82 which encircles the hubs. The low speed power rotational input to hub 77, however, may continue through pulley 75 fixed thereto, but it is ineffectual because of the one-way drive characteristic of the spring clutch 82. The high speed power input to the lower hub 81, by way of belt 105 and meshing gears 88 and 89, drives the flanged rollers 14a and 14b of the central roller means even though slower speed input is applied to pulley 75.

Referring now to FIGURES 3, 4 and 5, it is seen that an aligning track 106 is disposed along the bottom of guideway 12 whereby the bottom edge of each check is positioned parallel to its line of travel through the guideway. While the track may be provided by other means, it is shown as being formed by a lateral extension of the base portion of guideplate 10, and includes a rectangular slot 107 which provides the alignment. The aligning track is shown supported by horizontal stationary plate 58. Corresponding guideplate 11 is carried by the movable plate 64 by means of a pair of brackets 108 at its opposite ends, see FIGURE 2. The two brackets support the guideplate 11 with the bottom edge of the latter elevated to clear the adjacent side of the track 106 as is evident in FIGURES 3, 4 and 5.

Sometimes it is desired to inspect or clean the guideway 12, or in spite of all precautions, a check may become jammed in the guideway. In such an event, or for other malfunctioning, guide plate 11 and supporting plate 64, rigidly affixed thereto, the latter also carrying rollers 13b, 14b and 15b, are mounted for pivotal movement away from guideplate 10 so that channel 12 may be opened wide to remove the jammed item or for other purposes. Horizontal plate 64 is supported at spaced locations along its length by hinge levers 109 and 110, see FIGURES 2, 3 and 5, which are in turn mounted for pivotal movement as at 111 and 112 in vertical plate 113 of gear casing 51 and to hinge plate 114, respectively. As seen in FIGURE 5, hinge plate 114 is suitably fixed to stationary plate 58. The lower ends of hinge levers 109 and 110 are connected by means of links 115 to snubber units 116 which tend to minimize shock during the opening and closing operations. The gate 19 and print hammer 26, and their associated operating solenoids 20 and 29 respectively are also mounted on the movable supporting plate 64. As shown in FIGURES 1 and 2, this may be provided by suitable brackets 117 and 118 mounted on a reduced lateral extension of the plate 64. It is thus apparent that when the plate 64 and vertical plate 11 are swung outwardly they carry the rollers on their respective side of the guideway and also the gate and print hammer mechanisms therewith.

The rotatable part 9a of the drum may be driven directly from the motor 45 by an extension of the shaft 119 upon which the driving pulley 46 is mounted. The upper end of the shaft passes upwardly through the main supporting plate 58 wherein it is journalled and is connected internally to the larger upper part 9a of the drum to rotate the same. The smaller lower part of the drum is stationary and carries adjacent to its face the indicia sensing device H. FIGURE 1 shows a check C in dotted outline passing around the drum, the same check being shown in full line in the guideway in abutting engagement with the stop 19, the latter preferably having a bevelled working face to minimize the shock of contact of the leading edge of the check. In FIGURE 2, a check C is shown as being ejected from the apparatus by the third pair of rollers 15 where it may then be fed into the chute entrance of a sorter machine. Another check C is shown in FIGURE 2 moving around the drum preparatory to entering the guideway 12. Also with reference to FIGURE 2, the open housing 99 containing the electromagnetic clutch may be located at any suitable place and as herein shown, is mounted to the underside of a cross frame member 120 of the apparatus.

The present invention by utilizing roller means which are continuously rotating, obviates the need for high speed start-stop clutches and consequently operates with a minimum of power. In this connection it should be apparent that the power required to accelerate a sheet-like item, such as a bank check, is very small compared to the power required to accelerate rollers.

Having thus described a preferred embodiment of the invention for purposes of illustration, it will be understood that the inventive concept may be embodied in other forms without departing from the scope of the invention.

I claim:

1. In apparatus for decelerating, stopping and reaccelerating sequentially driven sheet items comprising, a pair of apertured plates spaced in parallel relationship to one another and defining a guideway for said items, a pair of roller means extending through the apertures of the guideway in opposed relation to one another and arranged to engage the opposite surfaces of a sheet item and drive the same through the guideway, said roller means having intermeshing ridge portions for engaging each item with the ridge portions of one roller means being disposed in overlapping relationship with the ridge portions of the opposite roller means, means for positively rotating both roller means of said pair at the same peripheral speed, and stop means movable while said roller means are rotating to one position across said guideway to arrest the movement of each item wherein said ridge portions of said roller means engage said items in sliding contact, said stop means being movable to a second position withdrawn from said guide way whereupon said roller means grip said item to reaccelerate the same, and means for moving said stop means between said one and said second positions.

2. In apparatus for decelerating, stopping and reaccelerating a driven sheet item comprising, first and second apertured plates forming a guideway, oppositely disposed roller means having peripheral portions thereof extending through the apertures in said plates and into said guideway for gripping and advancing said item therein, said roller means including first, second and third pairs of rollers disposed along said guideway in that order, means for rotating said pairs of rollers with said second pair of rollers rotated at a slower speed than said first and third pairs of rollers, stop means disposed along said guideway between said second and third pairs of roller means and movable to one position across said guideway to block the movement of the item, and movable to a second position withdrawn from said guideway, and means for moving said stop means between said one and said second positions, whereby when said sheet item is initially gripped by said first and second pairs of rollers, said second pair will brake the velocity of movement of said item and the item will slip relative to said first pair of rollers, and when said sheet item makes contact with and is stopped by said stop means positioned in said one position said second pair of rollers will slidingly engage said stopped sheet item, and when said stop means is moved to said second position said second roller means will cease slipping and engage said sheet items to reaccelerate said item to advance the same in said guideway into engagement with said third pair of rollers whereupon the latter are operative to pull said sheet item through said second pair of rollers.

3. A mechanism as set forth in claim 2 wherein each roller of said first and second pairs has annular disc portions of arcuate cross-section which are axially spaced on said roller, the radius of curvature of the arcuate cross-section portions of said second pair of rollers being greater than those of said first pair.

4. Apparatus as set forth in claim 2 wherein, the rollers of said third pair of rollers are normally in pressure engagement with each other with one roller of said pair including a plurality of axially spaced band means encircling said roller, the latter band means having a high coefficient of friction.

5. Apparatus as set forth in claim 2 and including hinge means mounting said first plate of guideway and its associated rollers to permit movement of the first plate away from said second plate to open said guideway.

6. In apparatus for decelerating, stopping and reaccelerating a driven sheet item comprising, first and second apertured plates forming a guideway, oppositely disposed roller means having peripheral portions thereof extending through said first and second apertured plates and within said guideway for gripping and advancing said item therein, said roller means including first, second and third pairs of rollers disposed along said guideway in that order, means for driving said first and third pairs of rollers at approximately the same speed, drive means connected to said second pair of rollers for driving said second pair of rollers at a slower speed of rotation than said first and third pairs of rollers, stop means disposed along said guideway between said second and third pairs of rollers and movable to one position across said guideway to block the movement of a sheet item, and movable to a second position withdrawn from said guideway, and means for moving said stop means between one and said second positions whereby when said sheet item is initially gripped by said first and second pairs of rollers, said second pair will decelerate the item, and when said sheet item makes contact with and is stopped by said stop means positioned in said one position said first and second pairs of rollers will slidingly engage said stopped sheet item, and when said stop means is positioned to said second position said first and second pairs of rollers will cease slipping and engage said sheet item to reaccelerate the item to advance the same in said guideway into engagement with said third pair of rollers whereupon the latter are operative to slidingly pull said sheet item through said second pair of rollers.

7. Apparatus for handling sheet items comprising a pair of closely spaced plates defining a guideway, roller means for moving said items along said guideway, said roller means comprising first, second and third pairs of rollers spaced in alignment along said guideway, the spacing between the pairs of rollers being less than the length of the shortest items to be handled whereby succeeding pairs of rollers receive the items before the items are free of the preceding pair of rollers, driving means for rotating said pairs of rollers at high speed for rapidly and successively moving the items through said guideway, speed change means for modifying the rotative speed of a second pair of rollers to a much slower speed than the other pairs of rollers whereby said items may be slowed down in their passage through the guideway while they are passing through said slower rotating pair of rollers, stop means, means for moving said stop means from an inoperative retracted position permitting said item to proceed through said guideway to an operative advanced position projecting across said guideway between the second and third pairs of rollers to stop the movement of said item in said guideway, and means for returning said stop means to its retracted position thereby to permit said stopped item to again be moved through said guideway by said continuously rotating rollers, said first and second pairs of rollers being constructed with flange-like peripheral projections spaced along their axes with the flanges of one roller overlapping but not contacting the flanges of the other roller of each pair whereby said items are corrugated lengthwise as they pass through said roller and whereby when the items are stopped by said stop means the rotating flanges engaging said item slip on the surfaces of the item.

8. Apparatus for controlling a driven sheet item along its feed path comprising, a pair of opposed rollers spaced from each other and disposed along said path for engaging opposite surfaces of said item, said rollers including a plurality of flange portions wherein the flange portions of one roller of said pair are axially staggered relative to the flange portions of the roller opposite it, means for positively rotating said pair of rollers, stop means movable to one position across said path to arrest the movement of the item whereupon the flange portions of both rollers of said pair engage said item in sliding contact without buckling the same in its direction of feed, said stop means being movable to a second position withdrawn out of said path whereupon said rollers grip said item to reaccelerate the same, and means for moving said stop means between said one and said second positions.

9. Apparatus for handling sheet items driven along a path of movement comprising roller means spaced along said path, said roller means comprising first, second and third pairs of opposed rollers disposed along said path, said first and second pairs of rollers each including annular flange portions adapted to corrugate the item therebetween, means for positively driving said first and second pairs of rollers, the spacing along said path between the pairs of rollers being less than the length of the shortest item to be handled whereby the second pair of rollers receive the items before the items are free of the first pair of rollers, stop means disposed between said second and third pairs of rollers along said path and movable to a first position to block the path of movement of the items whereby the flange portions of each roller of said first and second pairs of rollers engage opposite surfaces of said items in sliding contact therewith without crumpling the items against said stop means, said stop means being movable to a second position withdrawn from said path whereupon said first and second pairs of rollers cease sliding relative to the opposite surfaces of the items and drive the same past the first postion of said stop means and between and into engagement with said third pair of rollers, and means for moving said stop means between said first and said second positions.

10. Apparatus for handling a driven sheet item comprising, apertured means defining a guideway, a pair of rollers extending through the apertures of the guideway in opposed relation to one another and arranged to engage the opposite surfaces of a sheet item and drive the same through the guideway, said rollers including a plurality of flange portions adapted to corrugate the sheet item therebetween, means for continuously applying torque to both rollers of said pair to rotate the same at substantially the same peripheral speed, stop means movable to one position across said guideway to arrest the movement of the item while engaged by said rollers whereupon the rollers engage opposite surfaces of said item in sliding contact, said stop means being movable to a second position withdrawn from said guideway whereupon said rollers grip said item to again drive the item, and means for moving said stop means between said one and said second positions.

11. In an item handling device wherein an item driven in a given direction at an initial speed is decelerated without buckling the same in a direction corresponding to its direction of advancement comprising, a pair of rollers arranged in opposed relation to one another and each including a plurality of flange portions wherein the flange portions of one roller of said pair are axially staggered relative to the flange portions of the other roller of said pair, means for positively rotating said pair of rollers so that the peripheral speed of rotation of said flange portions is less than said initial speed, and means for advancing said item at said initial speed between said pair of rollers for engagement by the flange portions thereof, whereby the initial speed of said item in its direction of advancement is slowed by sliding engagement with the flange portions of said pair of rollers and is simultaneously corrugated in a direction transverse to said direction of advancement.

12. Apparatus for handling a driven sheet item comprising, apertured means defining a guideway, a pair of rollers extending through the apertures of the guideway in opposed relation to one another and arranged to engage the opposite surfaces of a sheet item and drive the same through the guideway, said rollers including a plurality of flange portions adapted to corrugate the sheet item therebetween, means for continuously applying torque to both rollers of said pair to rotate the same at substantially the same peripheral speed, stop means movable to one position across said guideway to arrest the movement of the item while engaged by said rollers whereupon the rollers engage opposite surfaces of said item in sliding contact, means interposed between said stop means and said pair of opposed rollers along said guideway for printing upon said item while arrested by the stop means, said stop means being movable to a second position withdrawn from said guideway whereupon said rollers grip said item to again drive the item, and means for moving said stop means between being said one and said second positions.

References Cited in the file of this patent

UNITED STATES PATENTS

| | | |
|---|---|---|
| 389,650 | Hawkins | Sept. 18, 1888 |
| 2,191,597 | Spiess | Feb. 27, 1940 |
| 2,214,751 | Pierce | Sept. 17, 1940 |
| 2,215,091 | Adatte et al. | Sept. 17, 1940 |
| 2,757,928 | Thomas | Aug. 7, 1956 |
| 2,843,377 | Battersby | July 15, 1958 |

UNITED STATES PATENT OFFICE
CERTIFICATE OF CORRECTION

Patent No. 2,992,821                      July 18, 1961

William H. Whitney

It is hereby certified that error appears in the above numbered patent requiring correction and that the said Letters Patent should read as corrected below.

Column 9, line 30, strike out "lengthwise"; column 10, line 59, strike out "being".

Signed and sealed this 5th day of December 1961.

(SEAL)
Attest:

ERNEST W. SWIDER                              DAVID L. LADD
Attesting Officer                                  Commissioner of Patents

USCOMM-DC